United States Patent [19]
Keller

[11] Patent Number: 5,285,367
[45] Date of Patent: Feb. 8, 1994

[54] LINEAR LOAD CIRCUIT TO CONTROL SWITCHING POWER SUPPLIES UNDER MINIMUM LOAD CONDITIONS

[75] Inventor: Richard A. Keller, Palo Alto, Calif.

[73] Assignee: Power Integrations, Inc., Mountain View, Calif.

[21] Appl. No.: 832,233

[22] Filed: Feb. 7, 1992

[51] Int. Cl.⁵ .................................... H02M 3/335
[52] U.S. Cl. ................................ 363/21; 363/78; 323/267; 323/282; 323/284
[58] Field of Search .................... 363/19, 21, 23, 25, 363/28, 78, 97; 323/222, 282, 284, 267, 902

[56] References Cited

U.S. PATENT DOCUMENTS

| | | | |
|---|---|---|---|
| 4,315,303 | 2/1982 | Snyder | 363/21 |
| 4,559,591 | 12/1985 | Grünsch | 363/21 |
| 4,649,464 | 3/1987 | Shono | 363/21 |
| 4,660,136 | 4/1987 | Montorefano | 363/26 |
| 4,677,534 | 6/1987 | Okochi | 363/21 |
| 4,903,182 | 2/1990 | Pilukaitis et al. | 363/19 |
| 4,935,858 | 6/1990 | Panicali | 363/21 |
| 4,996,638 | 2/1991 | Orr | 363/21 |
| 4,999,759 | 3/1991 | Cavagnold et al. | 363/21 |
| 5,055,747 | 10/1991 | Johns | 315/307 |
| 5,124,905 | 6/1992 | Kniepkamp | 363/19 |
| 5,140,511 | 8/1992 | Lee et al. | 363/21 |

FOREIGN PATENT DOCUMENTS 0255326 7/1987 European Pat. Off. .
104401 11/1987 Japan .
9116756 10/1991 PCT Int'l Appl. .

*Primary Examiner*—Steven L. Stephan
*Assistant Examiner*—Adolf Berhane
*Attorney, Agent, or Firm*—Thomas E. Schatzel

[57] ABSTRACT

An embodiment of the present invention is a switching power supply comprising a transformer with a primary and two secondaries, a switching transistor in series with the primary, a rectifier and filter on one secondary to provide regulated output power, a feedback control circuit that monitors the secondary and adjusts the duty cycle of an on-off control signal to the switching transistor to maintain a constant output at the terminals, and a monitor that detects when the power level flowing through the switching regulator has dropped to a predetermined minimum and then linearly turns on a load to the transformer. Transistor is typically a power MOSFET. The monitor tracks a summing junction current before any slope compensation is added. Load is a shunt regulator that is activated when the summing junction current falls below 12% of full scale. Alternatively, the predetermined value of 12% is adjustable. The shunt regulator load increases the load on secondary until the summing junction current returns to 12% of full scale. The feedback control circuit and monitor are preferably fabricated on a single monolithic integrated circuit which increases its power dissipation when the monitor activates the shunt regulator load.

5 Claims, 4 Drawing Sheets

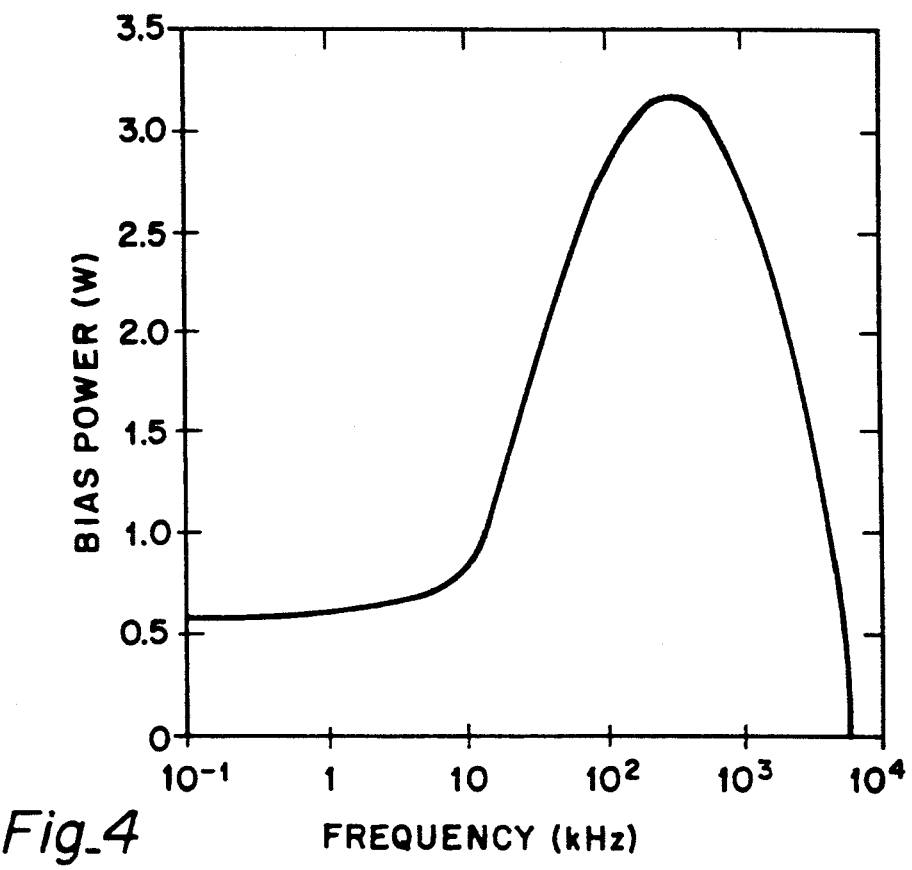
Fig_4
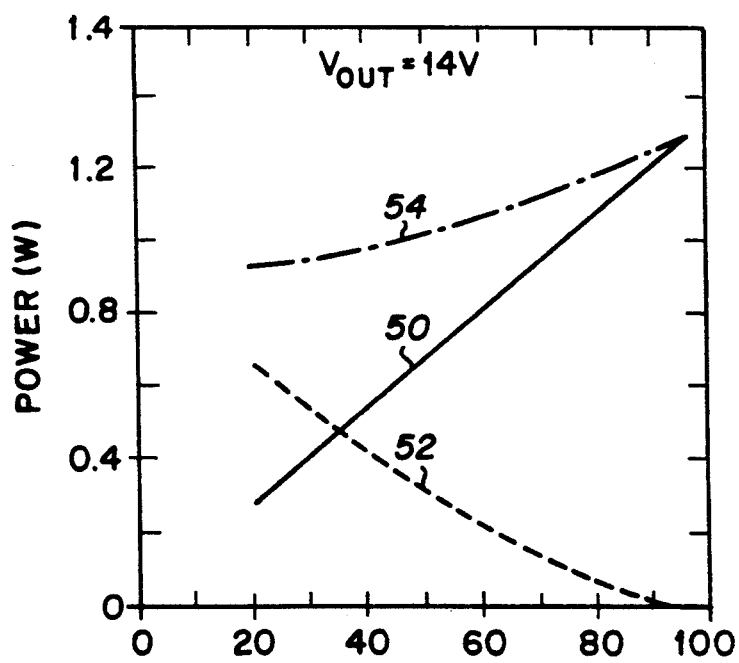
Fig_5

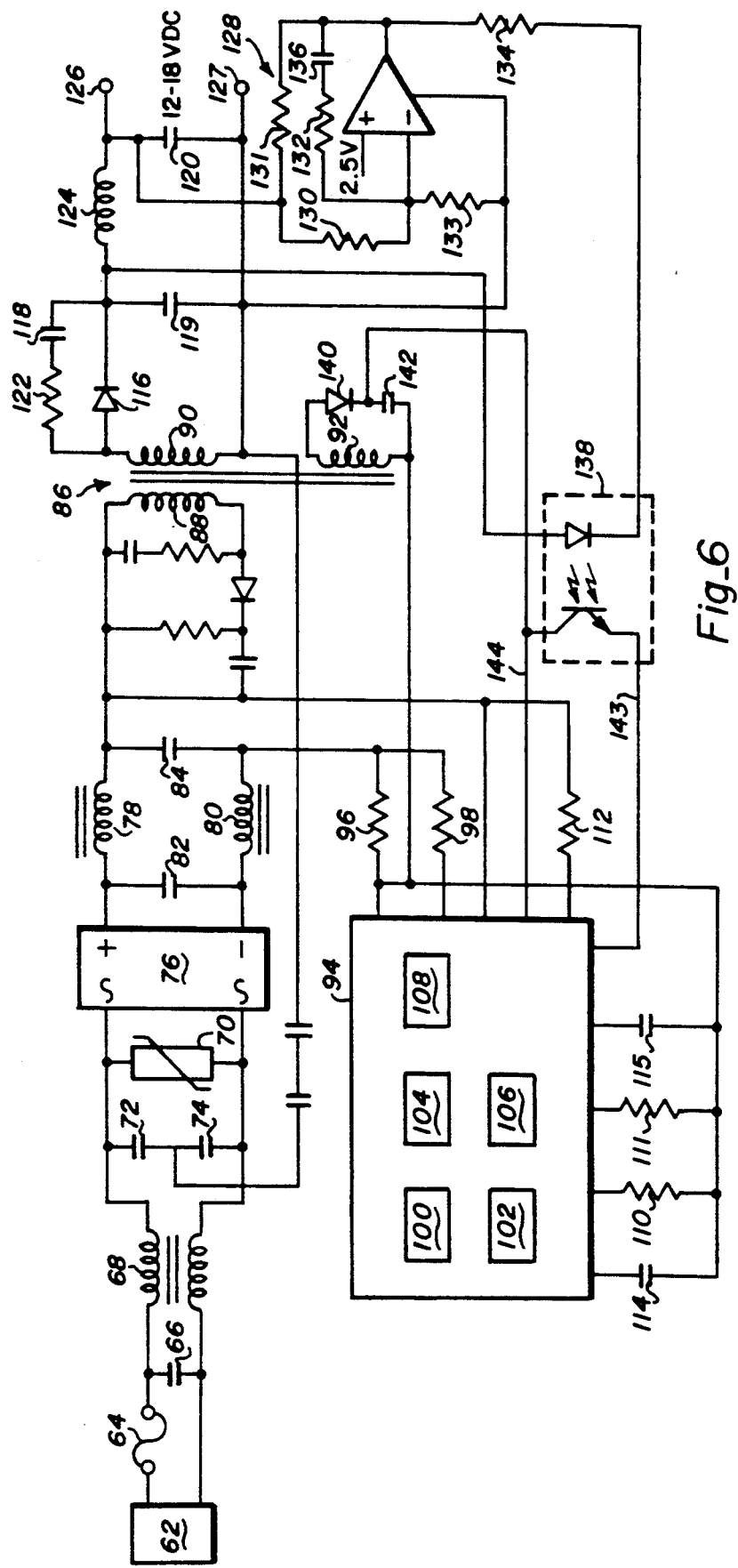
Fig_6

LINEAR LOAD CIRCUIT TO CONTROL SWITCHING POWER SUPPLIES UNDER MINIMUM LOAD CONDITIONS

BACKGROUND OF THE INVENTION

1. Field of the Invention

The present invention relates to electronic power supplies and specifically to switching power supplies that frequently encounter no load conditions and must be as efficient as possible to extend battery life and to reduce heat dissipation.

2. Description of the Prior Art

Two types of power supplies are in wide use that convert an incoming source to voltage levels useful to the equipment being powered. Linear power supplies are the simplest a series transistor typically drops enough voltage across it to maintain a constant output voltage. A problem with linear power supplies is that the heavier the output load, the more current will have to pass through the regulating transistor, since it is in series with the load. This increased current means more power must be dissipated by the transistor, and this power is thrown away as heat. Switching power supplies are more efficient and run cooler than linear power supplies at the same power levels. But switching power supplies are more complicated because a transistor operated as a switch is used to chop incoming current for a transformer that has the load connected to its secondary winding, usually through a rectifier and filter. A feedback circuit is needed to monitor the output voltage and increase the time duration the chopping transistor is on when more output voltage is needed and to reduce the time duration when less output voltage is needed. The feedback circuit often makes use of a third winding of the transformer. The advantages of the switching power supply are that they can operate either as step-up or step-down supplies, by adjusting the number of windings in the primary and secondary of the transformer, and less heat is dissipated by the transistor since it never operates in its linear region. The transistor is either fully off or fully on.

A problem develops in switching power supplies when the load is reduced to almost no load or is removed altogether. The feedback circuit has trouble making the pulses to the switching transistor narrow enough. Device limitations, circuit resistance, parasitic capacitances, loop delays, and the like, all conspire to make a switching power supply literally go wild at minimum loads. The prior art has attempted to correct this situation by a number of ways. One has been to simply put a shunt resistor across the output terminals that will draw the minimum current necessary to keep the output from going wild. The trouble with that is the resistor draws current all the time, it reduces the maximum current available externally, and it produces heat that may be hard to dispose of Zener diodes on the output can draw too much current, and their exact turn-on voltages may not be suitable for particular supplies. Other types of voltage clamps can fail to be properly matched with the voltage regulation point of the basic feedback circuit and so can draw too little or too much current in their attempts to control the output. Subharmonic oscillation of the switching transistor has also been tried. Sometimes called "hiccup mode", subharmonic oscillation can cause audible noise that is objectionable.

What is needed is a switching power supply that provides its own minimum load automatically as a part of the internal feedback control circuit that is deactivated when an external load that exceeds the minimum is connected.

SUMMARY OF THE PRESENT INVENTION

It is therefore an object of the present invention to provide a switching power supply hat maintains a constant and controlled voltage output from zero to maximum load conditions.

Briefly, an embodiment of the present invention is a switching power supply comprising a transformer with a primary and two secondaries, a switching transistor in series with the primary, a rectifier and filter on both of the secondaries to provide regulated output power, a feedback control circuit that monitors the other secondary output and adjusts the duty cycle of an on-off control to the switching transistor to maintain a constant output, and a monitor that detects when the power level flowing through the switching regulator has dropped to a predetermined minimum and then linearly turns on a load to the secondary output.

An advantage of the present invention is that it provides switching power supplies that are efficient with minimal waste of power.

Another advantage of the present invention is that the minimum load monitor can be implemented in a standard feedback control circuit chip and then used immediately in an otherwise unmodified system.

Another advantage of the present invention is that the monitor reduces output voltage overshoot when the load current is reduced by providing a shunt current path. This improves the load transient response at light loads.

Another advantage of the present invention is that the monitor improves the response for increasing load current at light load conditions by keeping the switching regulator running at a minimum load current. Thus the time to achieve the higher power operating point is reduced.

These and other objects and advantages of the present invention will no doubt become obvious to those of ordinary skill in the art after having read the following detailed description of the preferred embodiments which are illustrated in the various drawing figures.

IN THE DRAWINGS

FIG. 4 is a graph of a typical bias supply load power versus load transient frequency for a 50% duty cycle for the circuits of FIGS. 1 and 2;

FIG. 5 is a graph of a typical load, bias supply, and total power versus the load current for the circuits of FIGS. 1 and 2;

FIG. 6 is a schematic diagram of a switching power supply, according to a second embodiment of the present invention.

DETAILED DESCRIPTION OF THE EMBODIMENTS

Figure 1:
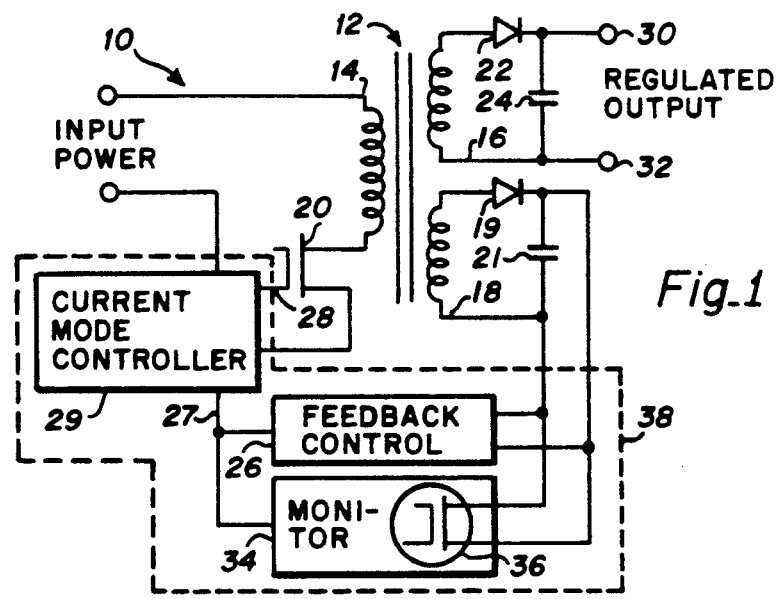
FIG. 1 is a schematic diagram of a switching power supply, according to a first embodiment of the present invention.

In FIG. 1, an embodiment of the present invention is a switching power supply 10 comprising a transformer 12 with a primary 14 and two secondaries 16 and 18, a diode 19, a switching transistor 20 in series with the primary 14, a capacitor 21, a rectifier 22 and shunt capacitor filter 24 on secondary 16 to provide regulated output power, a feedback control circuit 26 that monitors secondary 18 and adjusts a power level signal 27 and the duty cycle of an on-off control signal 28 from a current mode controller 29 to switching transistor 20 to maintain a constant output at terminals 30 and 32, and a monitor 34 that detects when the duty cycle to the switching transistor 20 has dropped to a predetermined minimum and then linearly turns on a load 36 to the transformer 12. Transistor 20 can be either a power MOSFET or a bipolar type transistor. The monitor 34 tracks a summing junction current, which is proportional to output power, before any slope compensation is added. Load 36 is a shunt regulator that is activated when the summing junction current falls below 12% of full scale. Other circuits and situations may dictate a trigger point of other than the example of 12% used here. Alternatively, the predetermined value of 12% could be made adjustable. The shunt regulator load 36 increases the load on secondary 18 until the summing junction current returns to 12% of full scale. The feedback control circuit 26 and monitor 34 are preferably on a single integrated circuit (IC) 38 which increases its power dissipation when monitor 34 activates shunt regulator load 36. However, this occurs when dissipation in transistor 20 is very low and its package has excess thermal capacity.

Figure 2:
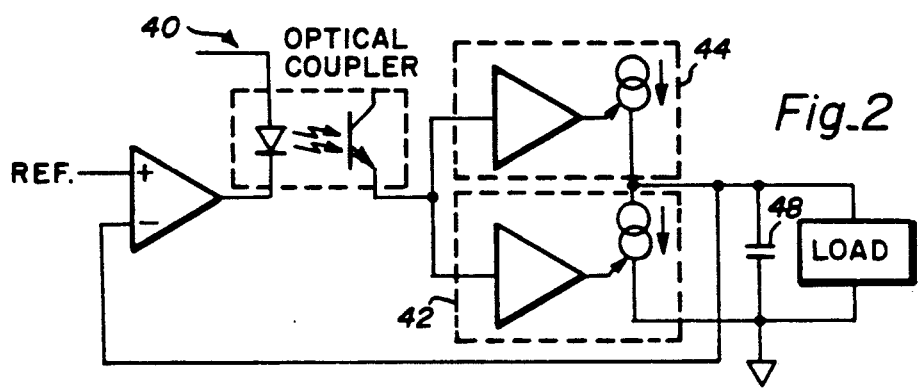
FIG. 2 is a schematic diagram of a control loop path, such as used in the switching power supply of FIG. 1.

In FIG. 2, a control loop gain path 40 is shown. The gain of a minimum load regulator 42 has been matched to the gain of a current mode switching regulator 44. Minimum load regulator 42 is functionally equivalent to monitor 34 and load 36, as is switching regulator 44 to current mode controller 29 and transistor 20. This situation allows the dynamics of the control loop to remain the same, whether or not the minimum load circuit is active.

Figure 3:
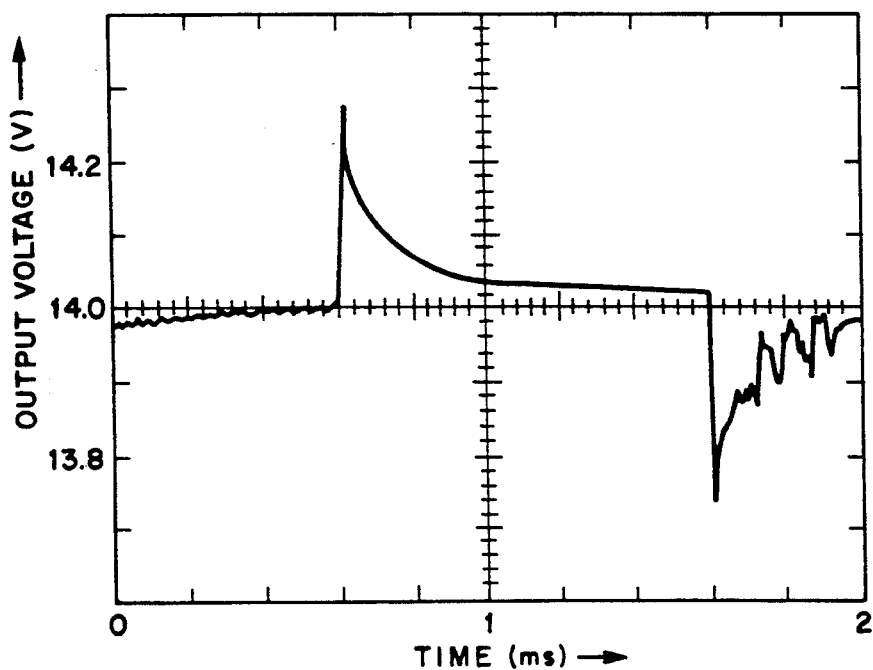
FIG. 3 is a graph of a typical output transient load response for the circuits of FIGS. 1 and 2.

FIG. 3 shows an output transient load response for the circuits of FIGS. 1 and 2. At light loads the gain of the switch mode path decreases and the gain of the minimum load path remains the same. The transient load response is not significantly degraded. An interesting side effect of the minimum load circuit is its affect on bias supply power during a transient. The power consumed from the bias supply is greater than the average of the two states when the period of the transient is close to the control loop response time.

FIG. 4 shows the bias supply load power versus load transient frequency for a 50% duty cycle for the circuits of FIGS. 1 and 2. The best load transient response has been observed to occur when an equivalent capacitance 48 (FIG. 2) on the bias supply is at a minimum.

FIG. 5 shows the load, bias supply, and total powers versus the load current for the circuits of FIGS. 1 and 2. A curve 50 represents the load power, a curve 52 represents the bias supply power, and a curve 54 represents the total power.

A flyback converter circuit 60 is shown in FIG. 6. Input power is accepted through a jack 62 and passes through a protection fuse 64 and a filter comprising capacitor 66 and transformer 68. A varistor 70 and a pair of capacitors 72 and 74 provide further noise reduction. A bridge rectifier 76 outputs direct current (DC) to a filter comprising chokes 78 and 80 and capacitors 82 and 84. One leg of the DC goes to a transformer 86 having a primary 88 and a pair of secondaries 90 and 92. The other leg of the DC goes to an IC 94 through a pair of resistors 96 and 98. IC 94 comprises a power MOSFET 100, a current mode controller 102, an internal bias regulator and protection circuit 104, an oscillator 106, and a minimum load circuit 108. IC 94 is similar to IC 38, described above. Power MOSFET 100 functions similar to transistor 20, also described above. A set of three resistors 110-112 and a pair of capacitors 114 and 115 set various parameters of operation for IC 94. Secondary 90 has a rectifier 116 that produces DC which is filtered by a set of three capacitors 118-120, a resistor 122, and a choke 124. A pair of terminals 126 and 127 output 12-18 VDC for external use. The output voltage on terminals 126 and 127 is monitored by a feedback amplifier 128 comprising a set of resistors 130-134 and a capacitor 136. Amplifier 128 drives an opto-isolator 138 harder as the output voltage increases. Opto-isolator 138 passes the error signal generated by amplifier 128 to the primary referenced IC 94 and is biased by the DC power produced from rectifying secondary 92 with a rectifier. 140 and filtering with a capacitor 142. The optical coupled error signal is accepted as a feedback signal 143 by IC 94 and a connection 144 allows minimum load circuit 108 to load secondary 92 when load conditions on terminals 126 and 127 fall below a predetermined minimum value, as reflected by secondary 90.

Figure 7:
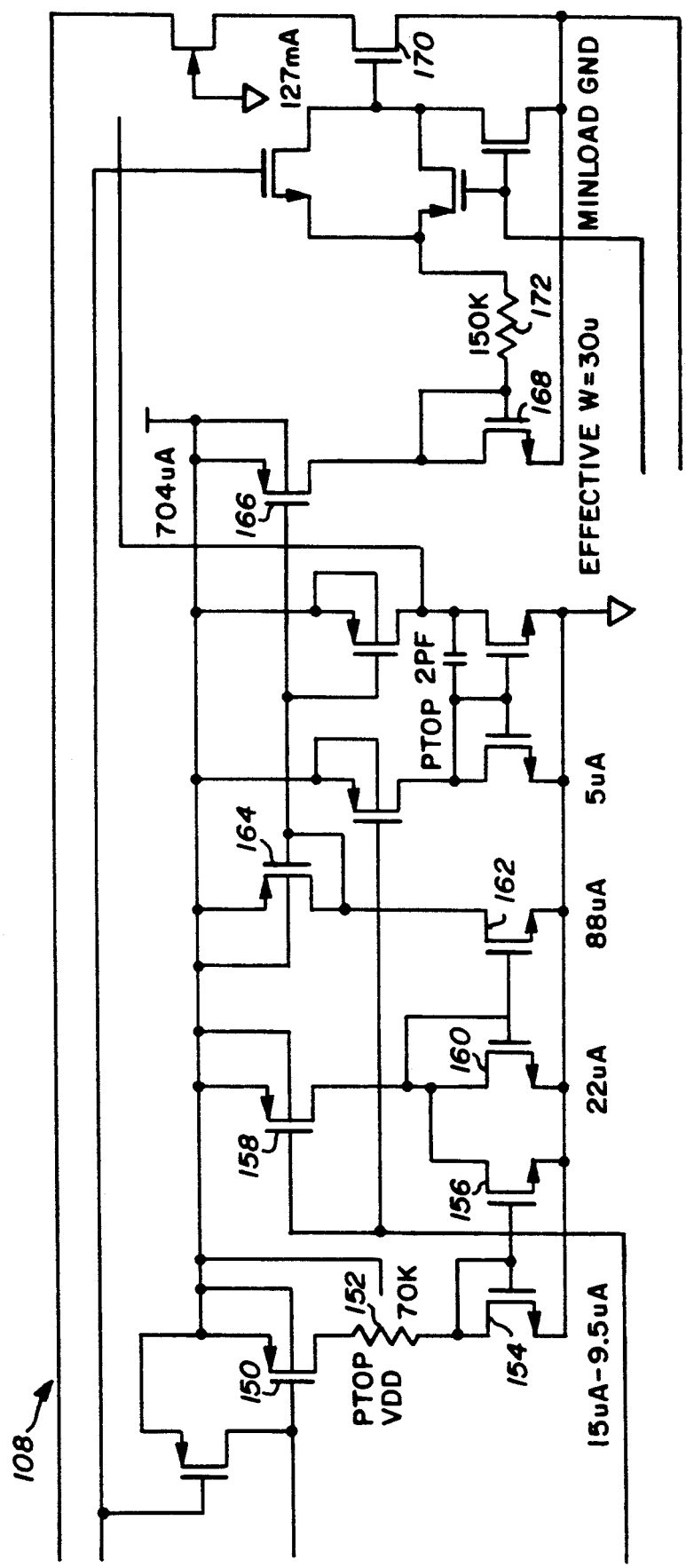
FIG. 7 is a schematic diagram of the minimum load circuit for the switching power supply of FIG. 6.

In FIG. 7, an exemplary design for monitor 34, load 36, monitor 42, and minimum load circuit 108 is shown. Other circuit designs are possible, depending on the type of devices being used and the availability of real estate on IC 94. Minimum load circuit 108 comprises a transistor 150 that mirrors a 0-120 microamp current, signal 27, which passes through a resistor 152 that limits the current to about fifty microamps. This current is then mirrored and amplified four times by transistors 154 and 156, and is subtracted from a fixed current of sixty microamps in a transistor 158. When the current in transistor 156 drops below sixty microamps, a current will start to flow in a transistor 160 and is mirrored to a plurality of transistors 162, 164, 166, 168, and 170, which then start to turn on. When the current in transistor 156 is about 38 microamps, transistor 170 will sink about 125 milliamps. The current gain from transistor 160 to transistor 170 is 5,760 (4×4×180), so 22 microamps of current through transistor 160 will result in 125 milliamps of current flowing through transistor 170. A resistor 172 and about 36 picofarads of gate capacitance in transistor 170 constitute a low pass resistor-capacitor (RC) filter.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A switching power supply for maintaining a regulated voltage into a variable output load that can include a no load condition and where the power supply includes a transformer with a primary winding for receiving unregulated input power and a first secondary winding for driving a regulated voltage output and a second secondary winding for controlling a power transistor in series with said primary winding with a feedback loop, comprising:
- a transistor linear regulator load connected as a load across said second secondary winding for proportionately shunting said second secondary winding;
- a monitor having a summing junction connected to sense a current in said second secondary winding which is proportional to a power output level of said switching power supply; and
- shunt control means connected to receive a signal from the monitor that represents said power output level and to produce a control signal to the transistor linear regulator load such that a predetermined minimum load on said power supply is maintained by the transistor linear regulator load despite said variable output load conditions that include no load, wherein a no-load or below minimum load condition of said regulated voltage output will be substantially fully compensated by a balancing load developed in said second secondary winding.

2. The power supply of claim 1, wherein:
the shunt control means includes means for responding with a turn-on signal to the transistor linear regulator load when said summing junction current drops below approximately 12% of its full scale value.

3. The power supply of claim 1, wherein:
the shunt control means has a gain equal to an associated current mode switching regulator gain.

4. An integrated circuit (IC) for a switching power supply that includes a transformer with a primary winding for receiving unregulated output power and a first secondary winding for driving a regulated voltage output and a second secondary winding for controlling a power transistor in series with said primary winding with a feedback loop, comprising in a single semiconductor device:
- a switching transistor for controlling input power to said primary winding and having a minimum operating duty cycle below which said regulated voltage output would otherwise become unregulated;
- a feedback circuit for sampling said secondary winding power output and for controlling the switching transistor to maintain said regulated output voltage above a predetermined minimum load value; and
- a minimum load monitor for proportionately adding an active load to said second secondary winding power output wherein the feedback circuit is operated at said predetermined minimum load value and the switching transistor is operated above said minimum operating duty cycle, wherein the minimum load monitor includes:
  - a current mirror transistor for receiving an input signal from a current mode controller;
  - a current limiting resistor for limiting current through the current mirror transistor;
  - a pair of first and second amplifier transistors for amplifying a current coupled from the current mirror transistor through the current limiting resistor;
  - a current-subtraction transistor for subtracting said amplified current from the pair of amplifier transistors from a fixed current;
  - a system of transistors for receiving a mirrored current from said second of the pair of amplifier transistors than first occurs when a current in said fist of the pair of amplifier transistors drops below a first predetermined current;
  - a low pass resistor-capacitor (RC) filter;
  - a load transistor coupled to the system of transistors through the low pass resistor-capacitor (RC) filter for sinking an increasing level of current said current in said first of the pair of amplifier transistors drops approaches a second predetermined current that is less than said first predetermined current.

5. The IC of claim 4, wherein:
the system of transistors has a current gain of approximately 5,760, wherein twenty-two microamperes of current through said second of the pair of amplifier transistors will result in approximately 125 milliamperes of current flowing through the load transistor; and
low pass resistor-capacitor (RC) filter comprises a 150 K ohm resistor and about 36 picofarads of gate capacitance in the load transistor.

* * * * *